(12) United States Patent
Gant

(10) Patent No.: US 12,454,353 B2
(45) Date of Patent: Oct. 28, 2025

(54) PERSONAL AIRCRAFT INCLUDING A ROTOR

(71) Applicant: Ascend Dynamics, LLC, Poplar, WI (US)

(72) Inventor: Daniel Brian Gant, Poplar, WI (US)

(73) Assignee: Ascend Dynamics, LLC, Poplar, WI (US)

( * ) Notice: Subject to any disclaimer, the term of this patent is extended or adjusted under 35 U.S.C. 154(b) by 59 days.

(21) Appl. No.: 18/176,312

(22) Filed: Feb. 28, 2023

(65) Prior Publication Data

US 2024/0010334 A1 Jan. 11, 2024

Related U.S. Application Data

(60) Provisional application No. 63/268,902, filed on Mar. 4, 2022.

(51) Int. Cl.
*B64C 39/02* (2023.01)
*B64C 27/32* (2006.01)

(52) U.S. Cl.
CPC ............ *B64C 39/026* (2013.01); *B64C 27/32* (2013.01)

(58) Field of Classification Search
CPC ............................. B64C 39/026; B64C 27/32
See application file for complete search history.

(56) References Cited

U.S. PATENT DOCUMENTS

| | | |
|---|---|---|
| 2,417,896 A | 3/1947 | Zimmerman |
| 3,053,480 A | 9/1962 | Vanderlip |
| 3,243,144 A | 3/1966 | Hulbert |
| RE26,756 E | 1/1970 | Moore |
| 5,419,514 A | 5/1995 | Duncan |
| 5,779,188 A | 7/1998 | Frick |
| 6,488,232 B2 | 12/2002 | Moshier |
| 6,874,728 B2 | 4/2005 | Lau |
| 10,933,987 B2 | 3/2021 | Zhang |
| 10,994,841 B2 | 5/2021 | Bitar |
| 11,511,854 B2 | 11/2022 | Baity |
| 2002/0003188 A1* | 1/2002 | Moshier ................ B64C 39/026 244/4 R |
| 2003/0197090 A1* | 10/2003 | Klima .................... B64D 17/00 244/4 A |
| 2006/0016930 A1 | 1/2006 | Pak |
| 2007/0290097 A1 | 12/2007 | Ishiba |
| 2009/0020654 A1* | 1/2009 | Tyler .................... B64C 39/026 244/23 A |
| 2013/0068895 A1 | 3/2013 | Zapata |
| 2016/0340035 A1* | 11/2016 | Duru .................... B64C 39/026 |
| 2017/0015419 A1 | 1/2017 | Tyler |
| 2017/0369162 A1* | 12/2017 | Alzahrani ............... B64C 25/22 |

(Continued)

FOREIGN PATENT DOCUMENTS

| | | |
|---|---|---|
| CN | 102485593 A | 6/2012 |
| CN | 102627147 A | 8/2012 |

(Continued)

*Primary Examiner* — Ashesh Dangol

(74) *Attorney, Agent, or Firm* — McGarry Bair PC

(57) ABSTRACT

A personal aircraft having a frame and at least one rotor. The frame includes a body panel at least partially defining a seat for a user. The at least one rotor is rotatable about a rotational axis. The at least one rotor is operably coupled to a respective portion of the frame and is provided on a first side of the personal aircraft.

19 Claims, 12 Drawing Sheets

(56) References Cited

U.S. PATENT DOCUMENTS

2019/0152602 A1      5/2019  Duru
2019/0329882 A1*   10/2019  Baity ................... B64U 30/14
2022/0355922 A1*   11/2022  Filho ................... B64C 39/026

FOREIGN PATENT DOCUMENTS

EP         3366582 B1    8/2018
WO        2019210128     10/2019

\* cited by examiner

PERSONAL AIRCRAFT INCLUDING A ROTOR

CROSS-REFERENCE TO RELATED APPLICATION

This application claims priority to U.S. Provisional Application No. 63/268,902, filed Mar. 4, 2022, which is incorporated herein in its entirety.

TECHNICAL FIELD

The present subject matter relates generally to a personal aircraft, and more specifically to a personal aircraft including a rotor.

BACKGROUND

A conventional aircraft can include any suitable engine that produces a thrust to maintain flight of the aircraft. Examples of aircraft include a personal aircraft. Conventional personal aircraft can include at least one rotor with a plurality of blades that rotate to create a thrust in desired direction. Conventional personal aircrafts with rotors have been used in a multitude of environments including, but not limited to, manned personal aircrafts (e.g., a non-commercial vehicle) or unmanned personal aircrafts (e.g., personal drones).

Conventional personal aircrafts, today, are bulky, large, and heavy resulting in, among other things, field of view issues, controllability issues, and size issues. Solutions to the issues of field of view issues, include moving a camera or a pilot of the personal aircraft forward of the forward most portion of the at least one rotor. This requires support structure and actually increases the overall footprint of the system. Solutions to the large footprint include reducing the size of the at least one rotor, which negatively affects the thrust generated by the at least one rotor. Further, if a larger rotor is desired, the aerial footprint of the personal aircraft is increased. This, in turn, lowers the distance that the personal aircraft can get to an object without hitting the object. This ultimately means that conventional personal aircrafts cannot be in scenarios where a user of the personal aircraft or the aircraft itself needs to get close to another object while flying the conventional personal aircraft.

DETAILED DESCRIPTION

Figure 1:
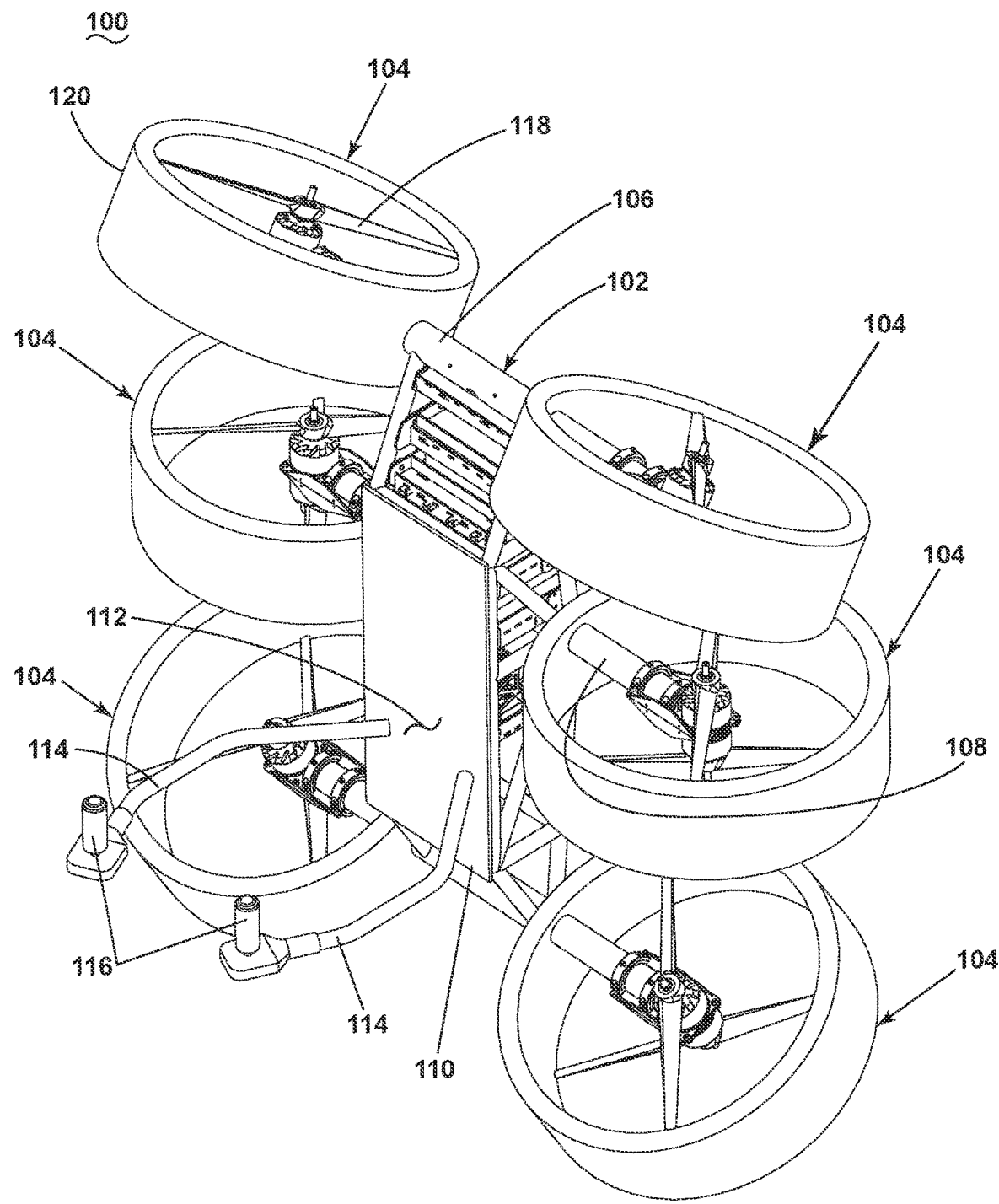
FIG. 1 is a schematic front perspective view of a first personal aircraft including at least one rotor.

Aspects of the disclosure described herein are directed to a personal aircraft including a set of rotors that rotate about a respective rotational axis. Each rotor of the set of rotors is defined by a center where a respective rotational axis meets the corresponding rotor. The aircraft includes a frame at least partially defining a seat. As used herein, the personal aircraft is any suitable aircraft in which the seat is provided on in front of the center of the rotors. The seat can be an area for a user to directly operate the personal aircraft or otherwise an area or a cavity within the personal aircraft used to hold various controllers and communication devices (e.g., receivers, transmitters, etc.) to support autonomous operation of the personal aircraft.

For purposes of illustration, the present disclosure will be described with respect to a personal aircraft. It will be understood, however, that aspects of the disclosure described herein are not so limited and that the personal aircraft as described herein can be implemented in any suitable aircraft. Aspects of the disclosure discussed herein may have general applicability within aircrafts for other mobile applications, industrial, commercial, and residential applications.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms "first", "second", and "third" may be used interchangeably to distinguish one component from another and are not intended to signify location or importance of the individual components.

The term "fore" or "forward" means in front of something and "aft" or "rearward" means behind something.

The term "fluid" may be a gas or a liquid. The term "fluid communication" means that a fluid is capable of making the connection between the areas specified.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values and/or endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

As used herein, a "system" or a "controller module" can include at least one processor and memory. Non-limiting examples of the memory can include Random Access Memory (RAM), Read-Only Memory (ROM), flash memory, or one or more different types of portable electronic memory, such as discs, DVDs, CD-ROMs, etc., or any suitable combination of these types of memory. The processor can be configured to run any suitable programs or executable instructions designed to carry out various methods, functionality, processing tasks, calculations, or the like, to enable or achieve the technical operations or operations described herein. The program can include a computer program product that can include machine-readable media for carrying or having machine-executable instructions or data structures stored thereon. Such machine-readable media can be any available media, which can be accessed by a general purpose or special purpose computer or other machine with a processor. Generally, such a computer program can include routines, programs, objects, components, data structures, algorithms, etc., that have the technical effect of performing particular tasks or implement particular abstract data types.

FIG. 1 is a schematic front perspective view of a first personal aircraft 100. The first personal aircraft 100 includes a frame 102 and a set of rotors 104.

The frame 102 can be any suitable body. As a non-limiting example, the frame 102 can include a plurality of tubes welded together. The frame 102 includes a first cross bar 106 and a second cross bar 108. It will be appreciated that the first cross bar 106 can be coupled to or integrally formed with the second cross bar 108. The first cross bar 106 and the second cross bar 108 directly couples a respective rotor of the set of rotors 104 to the frame 102. It will be appreciated that there can be any number of one or more first cross bars 106 and second cross bars 108. As a non-limiting example, there can be a total number of second cross bars 108 that corresponds to a total number of rotors of the set of rotors 104.

The frame 102 includes a body panel 110. The body panel 110 is defined as a panel or surface of the frame 102 that extends generally transverse the first personal aircraft 100. As a non-limiting example, the body panel 110 can extend between the set of rotors 104. The body panel 110 at least partially defines a seat 112. As used herein, the seat 112 can be any suitable space or cavity within the first personal aircraft 100 that is suitable for a physical user (e.g., a human) to be received within or for a control system to be received. A set of arms 114 can extend from the frame 102 and into the seat 112. As a non-limiting example, two arms 114 can extend from respective portions of the frame 102 (e.g., respective portions of the body panel 110) and into the seat 112. The body panel 110 and the set of arms 114 can, together, at least partially define the seat 112. A vehicle interface 116 is provided on a portion of the set of arms 114. The vehicle interface 116 can be any suitable interface or controller suitable for controlling the operation of the first personal aircraft 100. As a non-limiting example, the vehicle interface 116 can be, but is not limited to, a joystick, a screen, a control module, a wheel, a knob, or any combination thereof.

Each rotor of the set of rotors 104 includes a set of blades 118 and a shroud 120. The set of blades 118 can be any suitable blade that generate a thrust when rotated. As a non-limiting example, the set of blades 118 can be a set of airfoils. The shroud 120 circumscribes the set of blades 118. The shroud 120 can be used as a safety device to prevent contact of the set of blades 118 from exterior the rotor 104. The shroud 120 can be used to funnel or otherwise channel a flow of fluid over the set of blades 118. There can be any number of one or more rotors in the set of rotors 104. As a non-limiting example, there can be six rotors provided within the set of rotors 104 with each rotor of the set of rotors 104 corresponding to another rotor on an opposing side of the first personal aircraft 100. The first personal aircraft 100 can be symmetric or asymmetric about a vertical plane extending through the body panel 110, transverse the frame 102 and equidistant between at least two rotors of the set of rotors 104.

The first personal aircraft 100 can be made of any suitable material. As a non-limiting example, the tubes of the frame 102 can be made from a carbon fiber while the body panel 110 can be made from a plastic. In both cases, the material of the frame 102 can be a relatively light weight material, thus decreasing the overall weight of the first personal aircraft 100.

Figure 2:
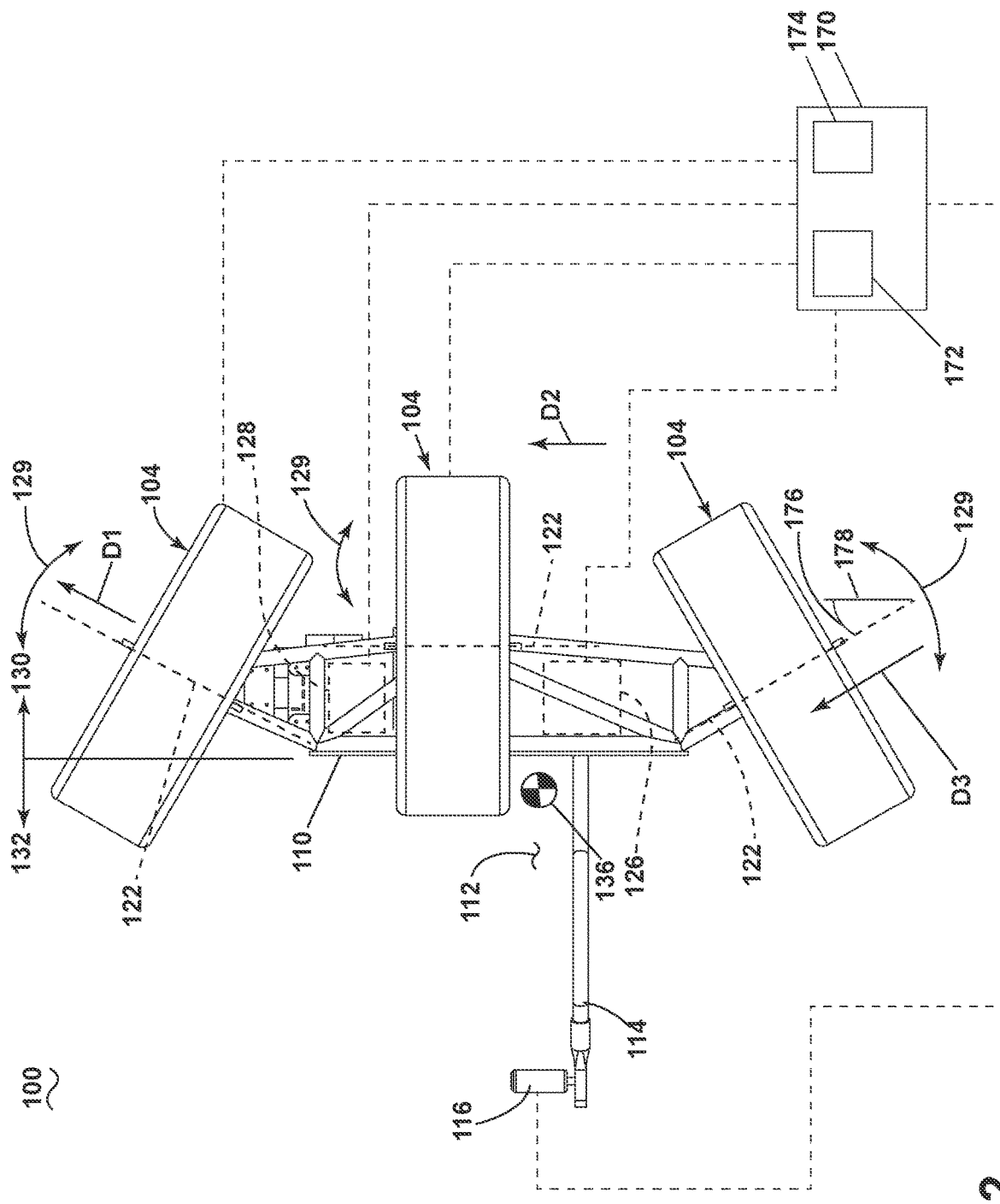
FIG. 2 is a schematic side view of the first personal aircraft of FIG. 1, further illustrating a center of mass of the first personal aircraft.

FIG. 2 is a schematic side view of the first personal aircraft 100 of FIG. 1. The first personal aircraft 100 includes various components provided within or otherwise housed within the frame 102. As a non-limiting example, an engine 126 and a power supply 128, each illustrated in phantom lines, are housed within the frame 102. The engine 126 and the power supply 128 can be provided within or along any suitable portion of the first personal aircraft 100.

The engine 126 and the power supply 128 can be operably coupled to one another such that the engine 126 is powered by the power supply 128 or the engine 126 stores power within the power supply 128. The engine 126 can be any suitable engine such as, but not limited to, a combustion engine, a jet engine, a turbine engine, a hybrid engine, or the like. In cases where the engine 126 is a combustion engine, a jet engine, a turbine engine, etc., the engine 126 can be defined as an engine 126 with a combustor. The power supply 128 can be any suitable power supply such as, but not limited to, a battery pack. The engine 126 or the power supply 128 can be operably coupled to the set of rotors 104 or any other suitable portion of the first personal aircraft 100 to ultimately supply power to the first personal aircraft 100.

While shown as including both the engine 126 and the power supply 128, it will be appreciated that one or the other of the engine 126 or the power supply 128 can be included. As a non-limiting example, the first personal aircraft 100 can include only the engine 126 such that the first personal aircraft 100 is powered entirely by the output of the engine 126. In such a case or in a case where the first personal aircraft 100 includes both the engine 126 and the power supply 128, a fuel tank can be included with the first personal aircraft 100 to supply a flow of fuel to the engine 126. As a non-limiting example, the first personal aircraft 100 can include only the power supply 128 such that the first personal aircraft 100 runs entirely off of the power supplied and stored within the power supply 128. In such a case, the first personal aircraft 100 can be an entirely electric aircraft such that a user needs to charge the power supply 128 in between flights. It will be appreciated that the engine 126 can be an electric motor that is driven by power stored within the power supply 128.

Each rotor of the set of rotors 104 is rotatable about a respective rotational axis 122. As a non-limiting example, the set of blades 118 (FIG. 1) of each rotor of the set of rotors 104 are rotatable about the rotational axis 122. Each rotor of the set of rotors 104 can further be movably coupled to the frame 102 such that at least one rotor of the set of rotors 104 can move or otherwise rotate along a first plane of movement 129. While illustrated as only being able to move in the first plane of movement 129, it will be appreciated that the set of rotors 104 can move along any suitable planes of movement such as a second plane of movement into and out of the page. The set of rotors 104 can be independently movable with respect to one another or otherwise oriented in differing directions. In other words, the set of rotors 104 can be statically mounted or otherwise movable to positions such that at least two rotational axis 122 are non-parallel.

It will be appreciated that a first rotor of the set of rotors 104 can be movable about the first plane of movement 129 while a second rotor of the set of rotors 104 can be movable about a second plane of movement, different from the first plane of movement. In such a case, the first and second rotor can be used for different purposes. As a non-limiting example, the first rotor can be used for yaw control while the second rotor is used for roll control.

In the case of a statically mounted set of rotors 104, the set of rotors 104 can be mounted at pre-set angles. As a non-limiting example, each rotor of the set of rotors 104 can include a mounting angle 176 formed with respect to a vertical plane 178 that intersects the respective rotational axis 122. The mounting angle 176 can be greater than or equal to 0 degrees and less than or equal to 90 degrees. As a non-limiting example, the mounting angle can be greater than or equal to 0 degrees and less than or equal to 45 degrees. As a non-limiting example, the mounting angle 176 can be 30 degrees.

The body panel 110 can split the first personal aircraft 100 between a first side of the first personal aircraft 100 denoted by arrow 130 and a second side of the first personal aircraft 100 denoted by arrow 132. The seat 112 can be provided on the second side of the first personal aircraft 100 while a portion of the set of rotors 104 can be provided on the first side of the first personal aircraft 100 As a non-limiting example, where the rotational axis 122 meets the respective rotor of the set of rotors 104 can be provided on the first side of the first personal aircraft 100.

The first personal aircraft can include a controller module 170 with a corresponding memory 172 and processor 174. The memory 172 can be defined as an internal storage for various aspects of the first personal aircraft 100. For example, the memory 172 can store code, executable instructions, commands, instructions, authorization keys, specialized data keys, passwords, or the like. The memory 172 can be RAM, ROM, flash memory, or one or more different types of portable electronic memory, such as discs, DVDs, CD-ROMs, etc., or any suitable combination of these types of memory. The processor 174 can be defined as a portion of the controller module 170 which can receive an input, perform calculations, and output executable data. The processor 174 can be a microprocessor.

The controller module 170 can be configured or adapted to execute controllable operations, for instance, in response to received signals, data, or the like, and generate control commands, signals, or another enabling or operative functional output. The controller module 170 can be further configured to monitor and report on the status of the various components within the first personal aircraft 100. For example, the controller module 170 can monitor various conditions of the set of rotors 104, the engine 126 or the power supply 128 such as, but not limited to, the power supplied to the set of rotors 104, the status of the set of rotors 104, or the amount of power available within the power supply 128. The controller module 170 can be used to command or otherwise relay commands to respective portions of the first personal aircraft 100. As a non-limiting example, the controller module 170 can be communicatively coupled to the vehicle interface 116 and receive instructions or commands from the vehicle interface 116. The controller module 170 can decipher these instructions or commands and instruct or command receptive portions of the first personal aircraft 100 to function based on the received instructions or command from the vehicle interface 116. While illustrated as exterior the frame 102, it will be appreciated that the controller module 170 can be provided along or within any suitable portion of the first personal aircraft 100. As a non-limiting example, the controller module 170 can be provided within or otherwise form the vehicle interface 116. As a non-limiting example, the controller module 170 can be used to command or otherwise communicate a command for at least one rotor of the set of rotors 104 to turn on, turn off, adjust a rotational speed, or otherwise move along at least the first plane of movement 129. The controller module 170 can further be defined as a flight control computer system that is used to control a stability and flight of the first personal aircraft 100.

The controller module 170 can further include preset or otherwise stored operations of the first personal aircraft 100 and be able to autonomously execute the preset operations without additional input from the vehicle interface 116 beyond a command to perform the stored operation. As a non-limiting example, a store operation can be, but is not limited to, a take-off operation, a landing operation, a cruise operation, a hover operation, or a maneuver operation.

During operation of the first personal aircraft 100, at least a portion of the set of rotors 104 rotate. It will be appreciated that the set of rotors 104 can all rotate in the same direction or at least two rotors of the set of rotors 104 can rotate counter to one another or in the same direction as one another. The rotation of the set of rotors 104, in turn, produces an upward thrust. As a non-limiting example, the three rotors of the set of rotors 104 illustrated in FIG. 2 can generate a first thrust vector (D1), second thrust vector (D2) and a third thrust vector (D3), collectively referred to as the thrust vectors. The resultant thrust vector (DR) defines a direction that the thrust vectors are cumulatively pushing the first personal aircraft 100. Each thrust vector can be parallel to the respective rotational axis 122. The thrust vectors can together define a resultant thrust vector (DR). The thrust vectors, or otherwise the production of thrust by the rotation of the set of rotors 104, can be used to control a flight of the first personal aircraft 100. As a non-limiting example, the thrust vectors of each rotor can be varied in direction or strength (e.g., the amount of thrust created), which can generate the resultant thrust vector (DR) in a desired direction. For example, if it is desired to go straight up, the set of rotors 104 can be controlled through use of the vehicle interface 116 and the controller module 170 such that the resultant thrust vector (DR) is pointing straight up. It will be appreciated that the result thrust vector (DR) can be established to point in any suitable direction.

The layout of the first personal aircraft 100 along with the resultant thrust vector (DR) allows for a center of mass 136 to be provided within the seat or otherwise provided on the second side of the first personal aircraft 100

Figure 3:
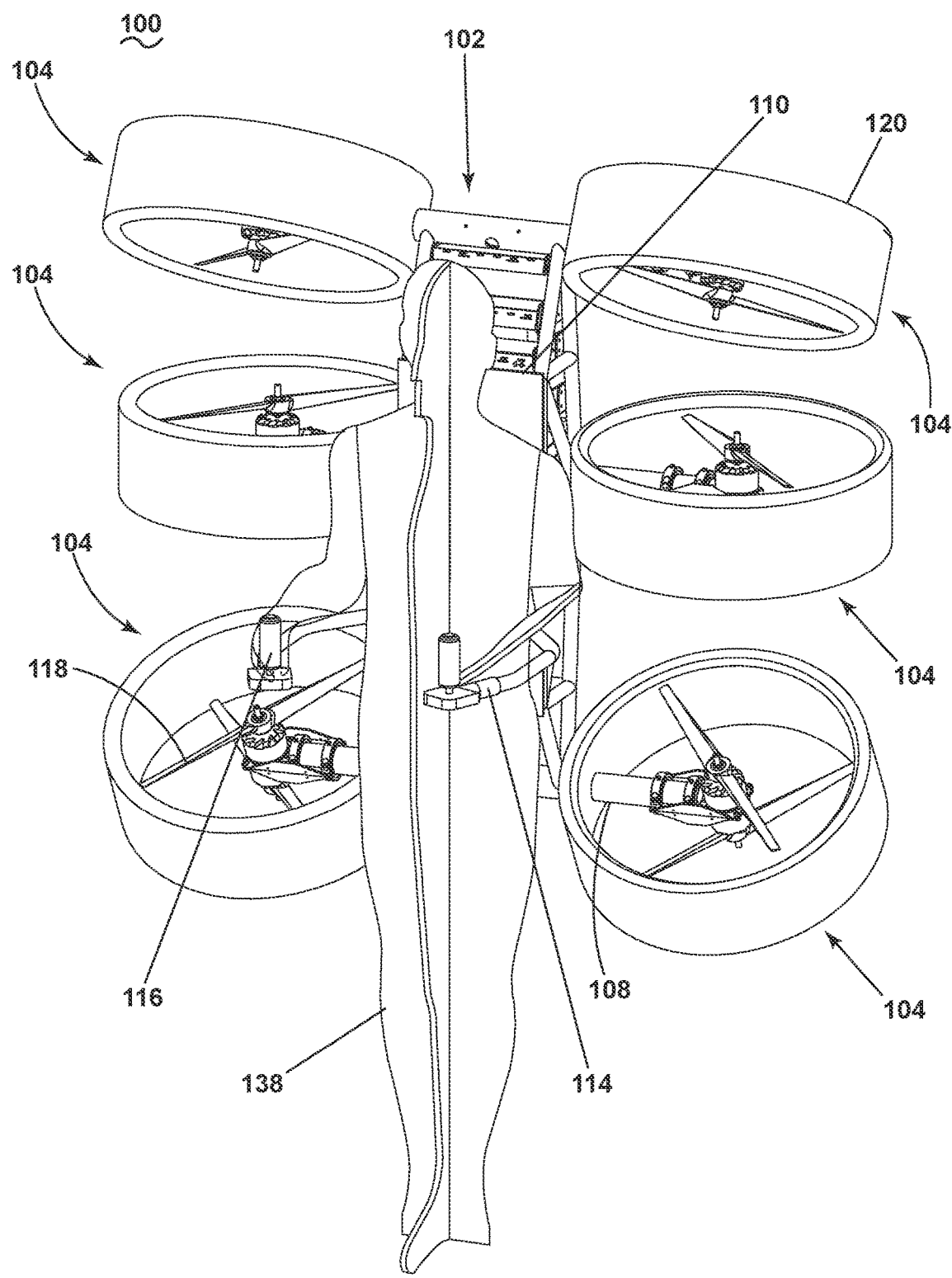
FIG. 3 is a schematic front perspective view of the first personal aircraft of FIG. 1, further illustrating a user operating the first personal aircraft.

FIG. 3 is a schematic front perspective view of the first personal aircraft 100 of FIG. 1. The first personal aircraft 100 can be operated by a single user 138. The user 138, as illustrated, can be a human received within the seat 112 (FIG. 1). The set of arms 114 can extend around the user 138 such that the vehicle interface 116 is provided in front of and easily accessible by the user 138.

The first personal aircraft 100 can include any suitable component to secure the user 138 within the seat 112. As a non-limiting example, the first personal aircraft 100 can include one or more straps (not illustrated) that the user can put around their torso such that the first personal aircraft 100 is received on the back of the user 138 like a backpack.

While shown and described in terms of the first personal aircraft 100 being mounted by and operated by a user 138 that is a physical human, it will be appreciated that the first personal aircraft 100 can be remotely operated by a ground-based user or otherwise be autonomously operated, without the need for a human, by the controller module 170 and the vehicle interface.

When being operated by a human user 138 that is mounted to or otherwise mounts the first personal aircraft 100 to them, the first personal aircraft 100 is light enough for the user 138 to walk freely on the ground. Alternatively, the user 138 can put on or otherwise be mounted to the first personal aircraft 100 when the first personal aircraft 100 is being held up by an eternal device (e.g., a table or a lift). The user 138 can then turn on the first personal aircraft 100 such that the resultant thrust vector (DR) (FIG. 2) is generated with enough force to allow the user to walk freely on the ground with the first personal aircraft 100 without leaving the ground. In other words, the first personal aircraft 100 can reduce the weight carried by the user 138 by creating the resultant thrust vector (DR).

The location of the center of mass 136 being on the second side of the first personal aircraft is beneficial as it allows for a better field of view from the front (designated by arrow 132) of the first personal aircraft 100. As a non-liming example, the large, bulky items such as the set of rotors are provided in the rear (designated by the arrow 130) of the first personal aircraft 100 and a user of the first personal aircraft 100 is received such that they face forward and do not have any portions of the first personal aircraft 100, beyond the set of arms 114 or the vehicle interface 116 in front of them. As such, the user 138 has a large field of view as the large, bulk items (e.g., the set of rotors 104) are not in front of the user 138. It is further contemplated that the configuration of the first personal aircraft 100 allows for a more versatile aircraft. As a non-liming example, as the front of the user 138 is open, the user 138 can utilize the first personal aircraft 100 as a maintenance vehicle such that the user 138 can fly up to an object (e.g., a light post, a building, a water tower, etc.) and perform maintenance on the object without the large, bulky items contacting the object.

Figure 4:
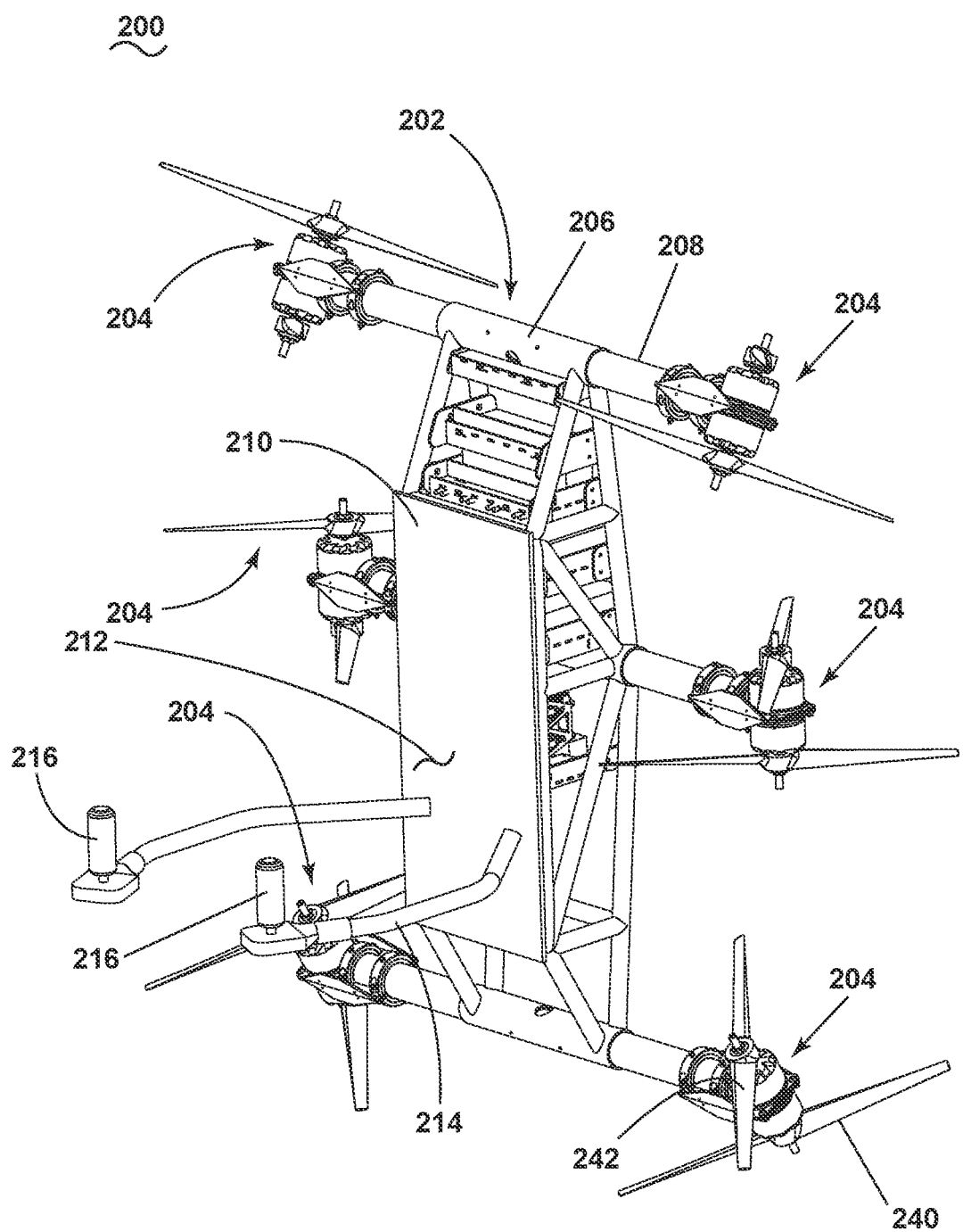
FIG. 4 is a schematic front perspective view of a second personal aircraft suitable for use as the first personal aircraft of FIG. 1, further illustrating at least one rotor with dual blades.

FIG. 4 is a schematic front perspective view of a second personal aircraft 200 suitable for use as the first personal aircraft 100 of FIG. 1. The second personal aircraft 200 is similar to the personal aircraft 100, therefore, like parts will be identified by like numerals increased to the 200 series with it being understood that the description of the personal aircraft 100 applies to the second personal aircraft 200 unless indicated otherwise.

The second personal aircraft 200 includes a frame 202 and a set of rotors 204 coupled to the frame 102 via at least one first cross bar 206 and at least one second cross bar 208. The frame 202 includes a body panel 210, a set of arms 214, and a vehicle interface 216. A seat 212 is at least partially defined by the body panel 210 or the set of arms 214. The vehicle interface 216 can be or include a controller module (not illustrated) to control operation of the second personal aircraft 200. The second personal aircraft 200 can be either controller remotely via a user, directly via a user mounted to the second personal aircraft 200, or autonomously via the vehicle interface 216. Each rotor of the set of rotors 204 can be statically mounted or movably mounted to the frame 202. Each rotor of the set of rotors 204, when movably mounted to the frame, can be independently movable along any suitable plane of movement.

The second personal aircraft 200 is similar to the first personal aircraft 100, except that the set of rotors 204 do not include the shroud 120 (FIG. 1) like the first personal aircraft 100. Further, the set of rotors 204 include a first group of blades 240 and a second group of blades 242 that rotate counter to or in the same direction as one another. In other words, the first group of blades 240 can rotate in a first circumferential direction with respect to the rotational axis (e.g., the rotational axis 122 of FIG. 2), while the second group of blades 242 can rotate in a second circumferential direction, opposite the first circumferential direction.

In comparison to the first personal aircraft 100, each rotor of the set of rotors 204 of the second personal aircraft 200 can be smaller in diameter than the set of rotors 104 of the first personal aircraft 100. The smaller diameter negatively affects the total power output (e.g., thrust) that a single rotor with a single group of blades can produce. As such, each rotor of the set of rotors 204 includes the first group of blades 240 and the second group of blades 242. This, in turn, allows for each rotor of the set of rotors 204 to produce the same amount of or exceed the amount of thrust that the set of rotors 104 of the first personal aircraft 100 can produce. The smaller diameter, however, allows for the elimination of the shroud as the set of rotors 204 have a smaller footprint and are provided far enough away from the seat 212 to not pose a threat to the user. The elimination of the shroud further reduces the weight of the second personal aircraft 200 in comparison to the first personal aircraft 100.

Figure 5:
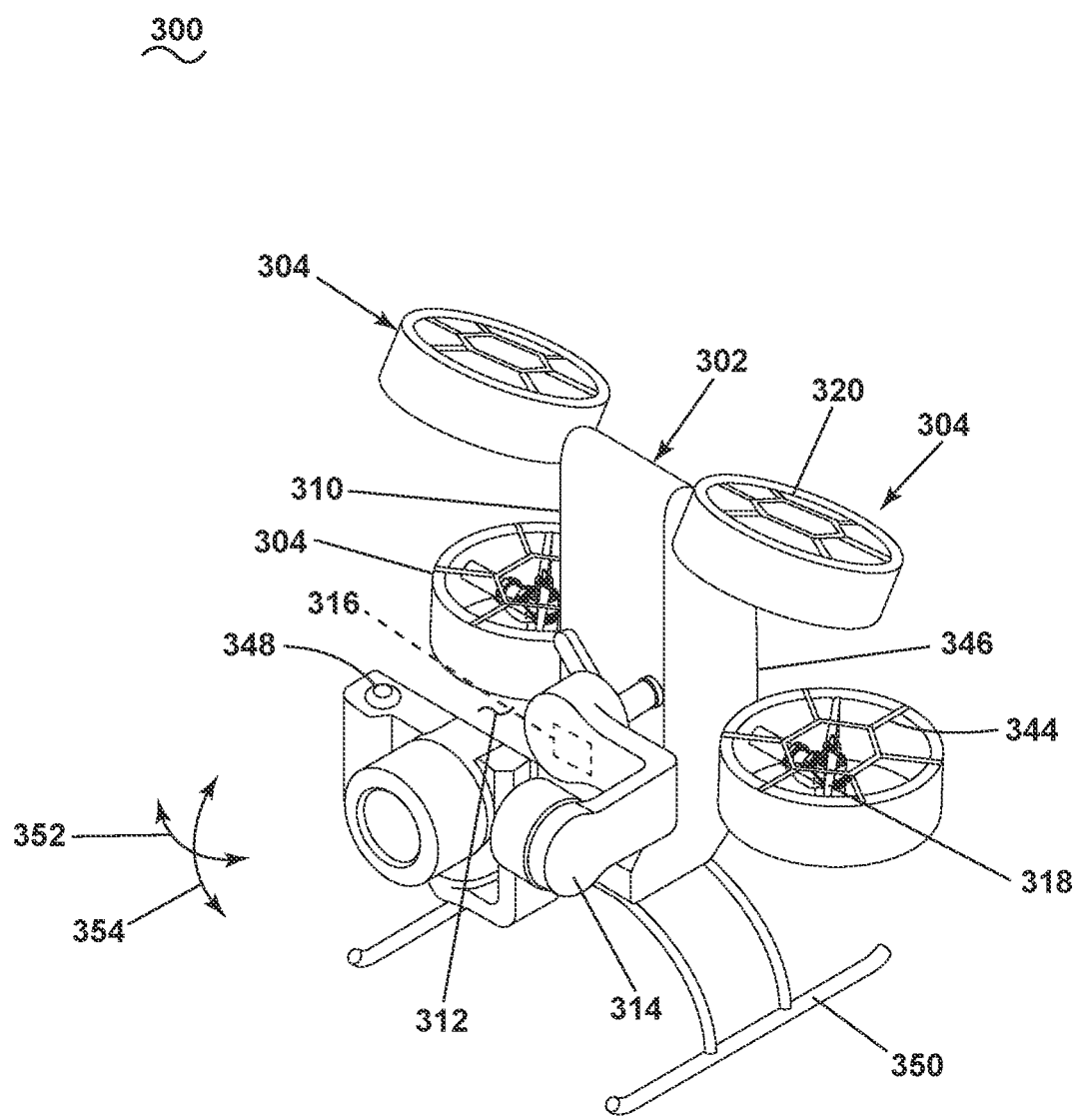
FIG. 5 is a schematic front perspective view of a third personal aircraft suitable for use as the first personal aircraft of FIG. 1, the third personal aircraft being an autonomous personal aircraft.

FIG. 5 is a schematic front perspective view of a third personal aircraft 300 suitable for use as the first personal aircraft 100 of FIG. 1. The third personal aircraft 300 is similar to the personal aircraft 100, 200, therefore, like parts will be identified by like numerals increased to the 300 series with it being understood that the description of the personal aircraft 100, 200 applies to the third personal aircraft 300 unless indicated otherwise.

The third personal aircraft 300 includes a frame 302 and a set of rotors 304 coupled to the frame 302. The frame 302 includes a body panel 310, a set of arms 314, and a vehicle interface 316. A seat 312 is at least partially defined by the body panel 310 or the set of arms 314. The vehicle interface 316 can be or include a controller module (not illustrated) to control operation of the third personal aircraft 300. The third personal aircraft 300 can be either controlled remotely via a user, directly via a user mounted to the second personal aircraft 300, or autonomously via the vehicle interface 316. Each rotor of the set of rotors 304 can be statically mounted or movably mounted to the frame 302. Each rotor of the set of rotors 304, when movably mounted to the frame, can be independently movable along any suitable plane of movement.

The third personal aircraft 300 is similar to personal aircraft 200, 300, except that the third personal aircraft 300 includes a single arm 314 extended from the body panel 310 and into the seat 312. The vehicle interface 316 can be provided within the arm 314 or within another portion of the third personal aircraft 300.

The frame 302 can further include a casing 346. The casing 346 can make up at least a respective portion of the body panel 310 (e.g., the front most portion of the casing 346 defining the seat 312). The casing 346 can be used to fully enclose various portions of the third personal aircraft 300 such as, but not limited to, the controller module, the power supply (e.g., the power supply 128 of FIG. 2) or the engine (e.g., the engine 126 of FIG. 2). The casing 346 can further be used as a storage compartment such that a user can place objects inside of the third personal aircraft 300 for transportation.

The third personal aircraft 300 can include a landing gear 350. The landing gear 350 can be any suitable landing gear 350 that allows for smooth take-off and landing of the third personal aircraft 300. The landing gear 350 can further ensure that the third personal aircraft 300 sits flat or otherwise able to stand upright when on ground.

The set of rotors 304 each include a shroud 320 similar to the shroud 120 (FIG. 1). The shroud 320, however, further includes webbing 344 covering the open ends of the shroud 120. The webbing 344 can take any suitable form and be used to ensure that objects do not enter the shroud and come into contact with the set of blades 318.

An auxiliary device 348 is mounted to the arm 314. As a non-limiting example, the auxiliary device 348 is a camera mounted to the arm 314. The arm 314 can further be defined as a gimbal such that the axillary device 348 can rotate in at least a second plane of movement 352 and a third plane of movement 354. The arm 314 can include one or more motors to allow for the movement of the auxiliary device 348. The auxiliary device 348 can be any device or combination of devices suitable for use for the operation of or otherwise during the operation of the third personal aircraft 300. As a non-limiting example, the auxiliary device 348 can be the camera and a tool (e.g., a welding tool, a saw, a clamp, etc.) such that the camera can be used for flying the third personal aircraft 300 and the tool, along with the camera, can be used to perform maintenance or construction operations while in flight.

The third personal aircraft 300 is an autonomous aircraft or an aircraft that is controlled or flown by a pilot remotely. In either case, the third personal aircraft 300 is not suited to receive a human in the seat 312. Instead, the arm 314 and the auxiliary device 348 are provided within the seat 312. It is contemplated that a pilot or the controller module can utilize the auxiliary device 348 during flight of the third personal aircraft 300 to at least operate the third personal aircraft 300. As a non-limiting example, the auxiliary device 348 can be a visible light camera that allows a user to fly the third personal aircraft 300 through sight or otherwise videos captured by the auxiliary device 348. As a non-limiting example, the auxiliary device 348 can be a non-visible light or a visible light camera that the controller module (e.g., the vehicle interface 316) communicates with to determine the location of and the surroundings of the third personal aircraft 300. In either case, the auxiliary device 348 can be used in assisting in the flight of the third personal aircraft 300.

Figure 6:
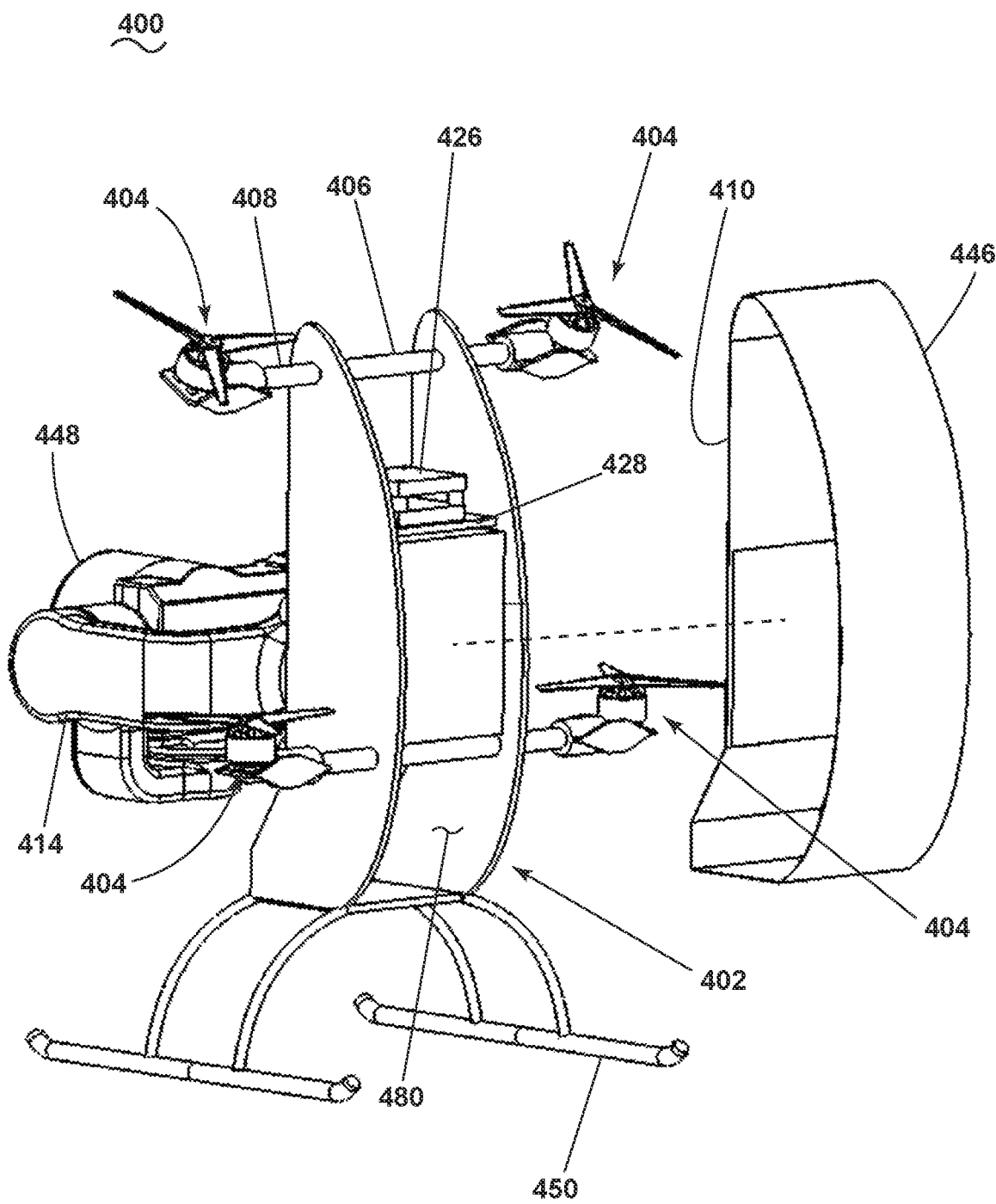
FIG. 6 is a schematic front perspective view of a fourth personal aircraft suitable for use as the first personal aircraft of FIG. 1, further illustrating a removable case enclosing an interior.

FIG. 6 is a schematic front perspective view of a fourth personal aircraft 400 suitable for use as the first personal aircraft 100 of FIG. 1. The fourth personal aircraft 400 is similar to the personal aircraft 100, 200, 300, therefore, like parts will be identified by like numerals increased to the 400 series with it being understood that the description of the personal aircraft 100, 200, 300 applies to the fourth personal aircraft 400 unless indicated otherwise.

The fourth personal aircraft 400 includes a frame 402 and a set of rotors 404 coupled to the frame 402. The frame 402 includes a body panel 410, a set of arms 414, and a vehicle interface. A seat is at least partially defined by the body panel 410 or the set of arms 414. The vehicle interface can be or include a controller module (not illustrated) to control operation of the fourth personal aircraft 400. The fourth personal aircraft 400 can be either controller remotely via a user, directly via a user mounted to the second personal aircraft 400, or autonomously via the vehicle interface. Each rotor of the set of rotors 404 can be statically mounted or movably mounted to the frame 402. Each rotor of the set of rotors 404, when movably mounted to the frame, can be independently movable along any suitable plane of movement.

The fourth personal aircraft 400 is similar to the third personal aircraft 300 in that it includes a singular arm 414 coupled to an auxiliary device 448 (e.g., a camera). The difference, however, is that the set of rotors 404 do not include the shroud 320 (FIG. 6).

The fourth personal aircraft 400 can include the frame 402 with the case 446. The case 446, as illustrated, is removable from a remainder of the frame 402. While an entirety of the case 446 is shown to be removed, it will be appreciated that a user of the fourth personal aircraft 400 can remove a section of, an entirety of, or otherwise open a door or a hatch on the case 446. The removable nature or the openable nature of the case 446 allows for selective access to various components or articles received within an interior 480 of the frame 402. As a non limiting example, an engine 426 and a power supply 428 can be received within the interior 480. Additionally, cargo or other components can be received within the interior 480. The interior 480 can be sealed off via the case 446 during flight of the fourth personal aircraft 400.

Figure 7:
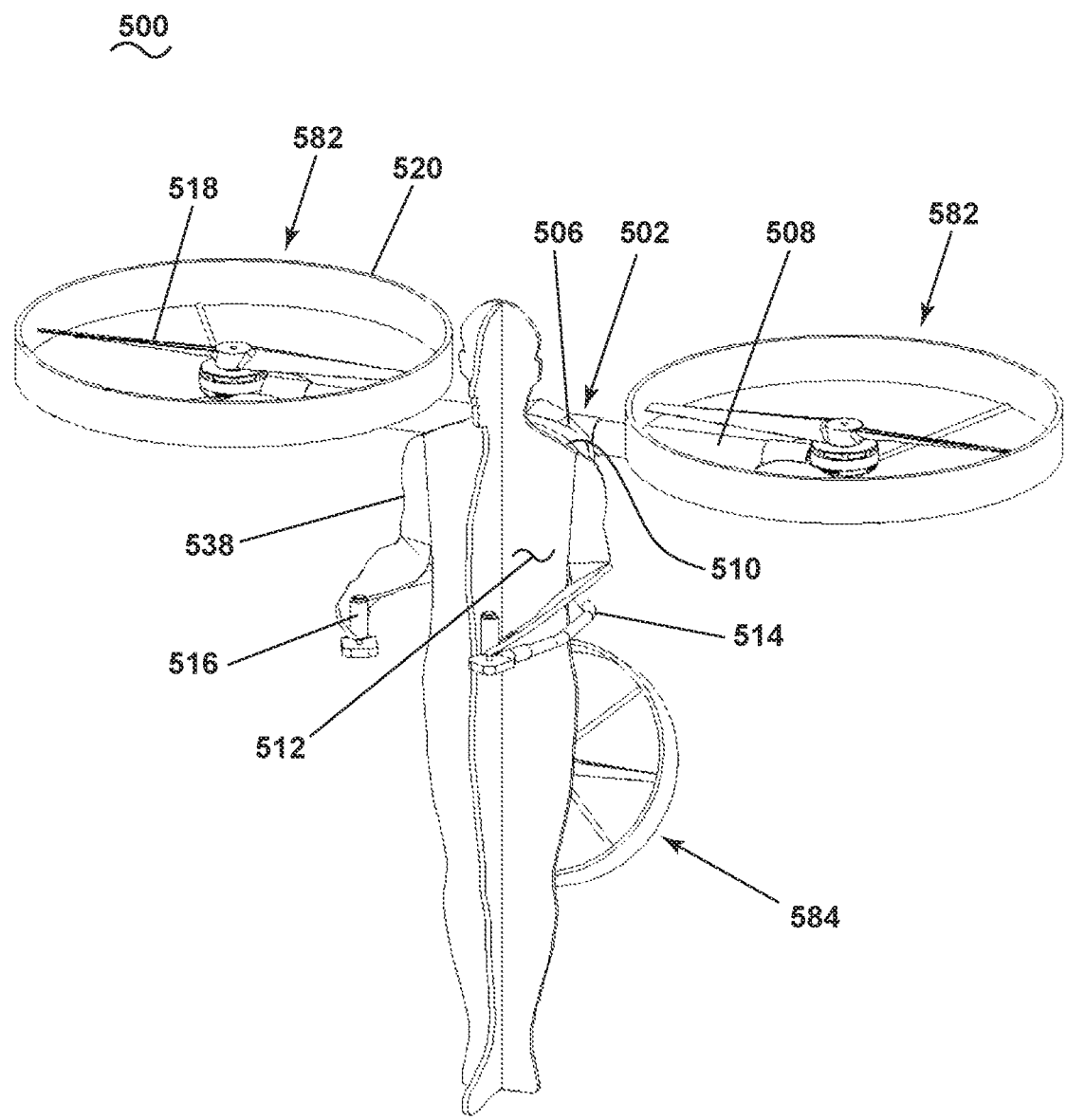
FIG. 7 is a schematic front perspective view of a fifth personal aircraft suitable for use as the first personal aircraft of FIG. 1, further illustrating a plurality of rotors of differing sizes.

FIG. 7 is a schematic front perspective view of a fifth personal aircraft 500 suitable for use as the first 100 personal aircraft of FIG. 1. The fifth personal aircraft 500 is similar to the personal aircraft 100, 200, 300, 400, therefore, like parts will be identified by like numerals increased to the 500 series with it being understood that the description of the personal aircraft 100, 200, 300, 400 applies to the fifth personal aircraft 500 unless indicated otherwise.

The fifth personal aircraft 500 includes a frame 502 and a set of rotors coupled to the frame 502. The frame 502 includes a body panel 510, a first cross bar 506, a second cross bar 508, a set of arms 514, and a vehicle interface 516. A seat 512 is at least partially defined by the body panel 510 or the set of arms 514. The vehicle interface 516 can be or include a controller module (not illustrated) to control operation of the fifth personal aircraft 500. The set of rotors are operably coupled to the frame 502 via the first cross bar 506 and the second cross bar 508. The set of rotors each include a set of blades 518 circumscribed by a respective shroud 520. The fifth personal aircraft 500 can be either controller remotely via a user 538, directly via a user mounted to the second personal aircraft 500, or autonomously via the vehicle interface 516. Each rotor of the set of rotors can be statically mounted or movably mounted to the frame 502. Each rotor of the set of rotors, when movably mounted to the frame, can be independently movable along any suitable plane of movement.

The fifth personal aircraft 500 includes the set of rotors with varying sizes. As a non-limiting example, an upper pair of rotors 582 of the set of rotors are larger than a lower rotor 584 of the set of rotors.

Figure 8:
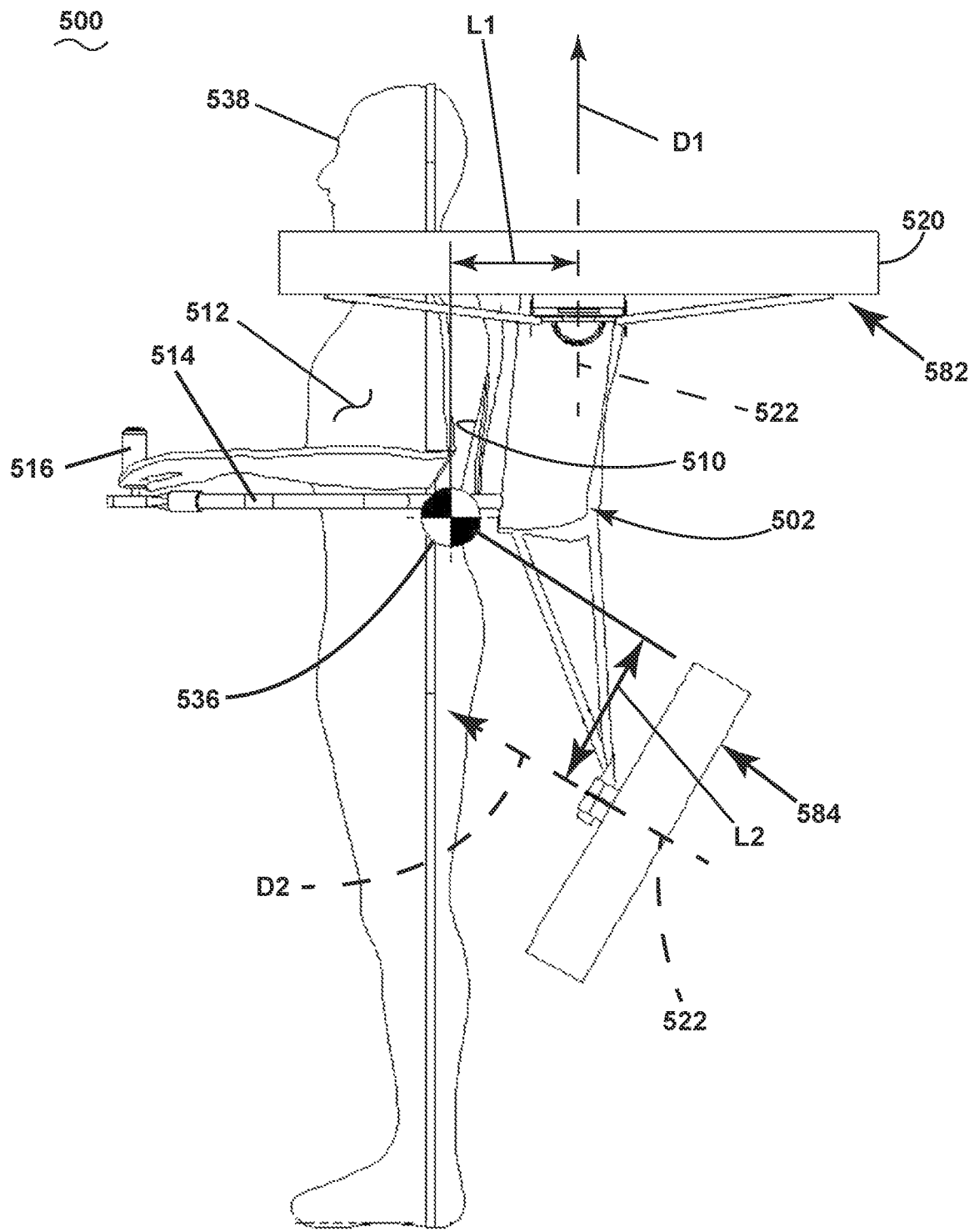
FIG. 8 is a schematic side view of the fifth personal aircraft of FIG. 7, further illustrating a center of mass of the fifth personal aircraft.

FIG. 8 is a schematic side view of the fifth personal aircraft 500 of FIG. 7. Each rotor of the set of rotors rotates about a rotational axis 522.

The set of rotors can be positioned along any suitable portion of the fifth personal aircraft 500 that locates the rotational axis 522 on the first side (e.g., the first side denoted by arrow 132 of FIG. 2) of the fifth personal aircraft 500. As a non-limiting example, the rotational axis 522 of at least one of the upper pair of rotors 582 can be provided a first distance (L1) from a plane extending from the center of mass 536 and parallel to the respective rotational axis 522. As a non-limiting example, the rotational axis 522 of the lower rotor 584 can be provided a second distance (L2) from a plane extending from the center of mass 536 and parallel to the respective rotational axis 522.

Figure 9:
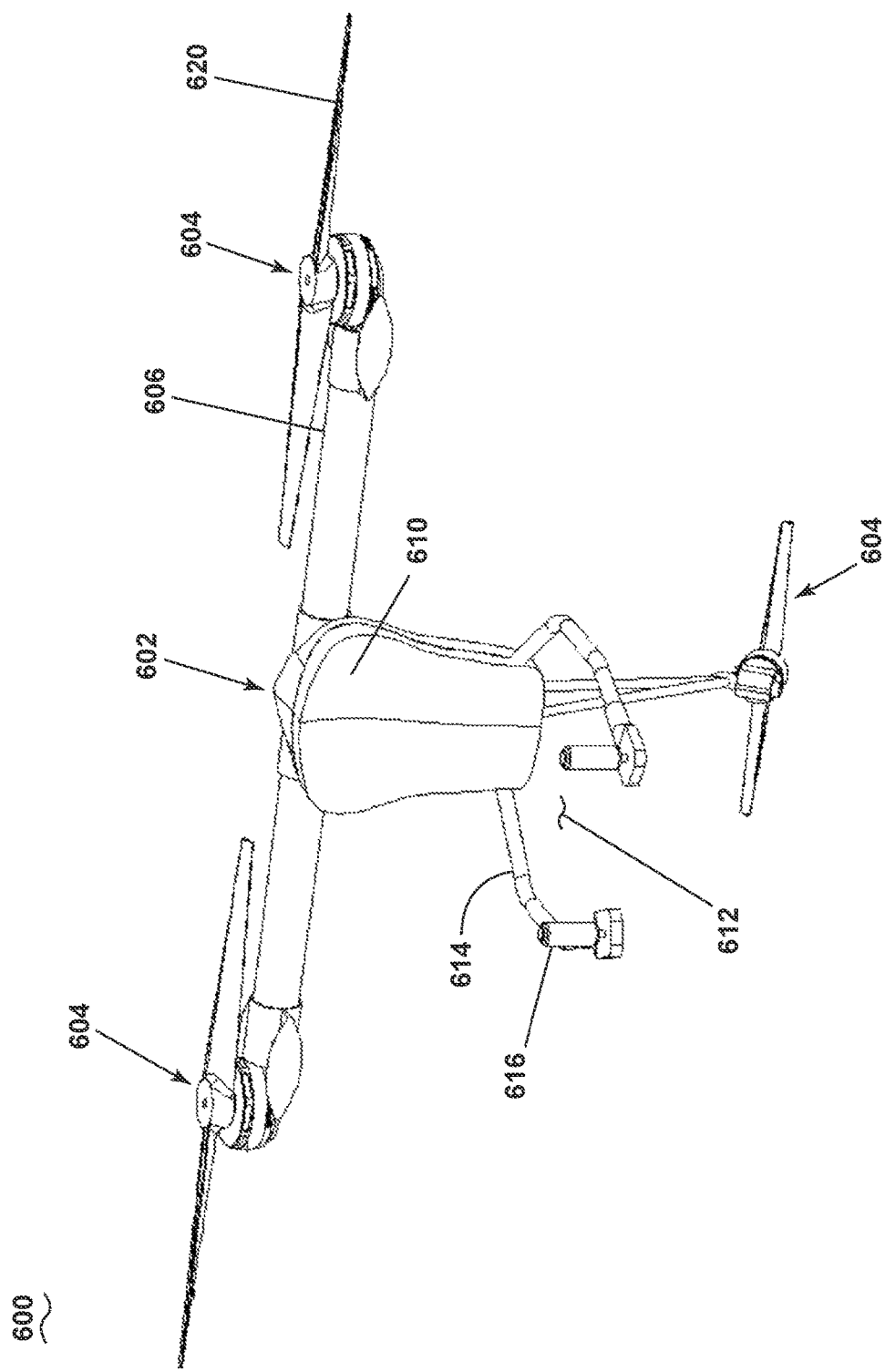
FIG. 9 is a schematic front perspective view of a sixth personal aircraft suitable for use as the first personal aircraft of FIG. 1, further illustrating at least one rotor.

During operation, the upper pair of rotors 582 each generate a first thrust vector (D1) while the lower rotor 584 generates a second thrust vector (D2). In the instance where the upper pair of rotors 582 are statically mounted to the frame 502, the upper pair of rotors 582 are used to generate lift and a forward tilting moment through the first thrust vector (D1) and the distance (L1). In other words, the upper pair of rotors 582 can increase the total thrust along the first thrust vector (D1) in order to climb in altitude or otherwise take-off, and decrease in the total thrust along the first thrust vector (D1) to decrease in altitude or otherwise land. In addition the upper pair of rotors 582 can tilt the aircraft forward due to the moment created around the center of mass by the first thrust vector (D1) being offset by the distance (L1) from the center of mass (e.g. the center of mass 136 of FIG. 2). The lower rotor 584 can be movably mounted to the frame 502 and be used to control the roll or yaw of the fifth personal aircraft 500. As a non-limiting example, to tilt forward, the lower rotor 584 can operate such that the second thrust vector (D2), as illustrated is decreased allowing for an imbalance of forces around the center of mass. To tilt backwards, an increase in the second thrust vector as illustrated can be generated resulting in an imbalance of forces around the center of mass in the opposite direction. It is noted that the balanced use of resulting thrust vectors (D1) and (D2) allow for pitch control of the aircraft FIG. 9 is a schematic front perspective view of a sixth personal aircraft 600 suitable for use as the first personal aircraft 100 of FIG. 1. The sixth personal aircraft 600 is similar to the personal aircraft 100, 200, 300, 400, 500, therefore, like parts will be identified by like numerals increased to the 600 series with it being understood that the description of the personal aircraft 100, 200, 300, 400, 500 applies to the sixth personal aircraft 600 unless indicated otherwise.

The sixth personal aircraft 600 includes a frame 602 and a set of rotors coupled to the frame 602. The frame 602 includes a body panel 610, a first cross bar 606, a second cross bar 608, a set of arms 614, and a vehicle interface 616. A seat 612 is at least partially defined by the body panel 610 or the set of arms 614. The vehicle interface 616 can be or include a controller module (not illustrated) to control operation of the sixth personal aircraft 600. The set of rotors are operably coupled to the frame 602 via the first cross bar 606 and the second cross bar 608. The set of rotors each include a set of blades 618. The sixth personal aircraft 600 can be either controller remotely via a user, directly via a user mounted to the second personal aircraft 600, or autonomously via the vehicle interface 616. Each rotor of the set of rotors can be statically mounted or movably mounted to the frame 602. Each rotor of the set of rotors, when movably mounted to the frame, can be independently movable along any suitable plane of movement.

The sixth personal aircraft 600 is similar to the fifth personal aircraft 500 in that the set of rotors include an upper pair of rotors 682 and a lower rotor 684. The difference, however, is that the set of rotors do not include the shroud 520 (FIG. 8). As such, the sixth personal aircraft 600, like the second personal aircraft 200 in comparison with the first personal aircraft 300, has a smaller footprint than the fifth personal aircraft 500. The body panel 610 is further an ergonomic body panel that can include at least one harness 688 for securing a user to the sixth personal aircraft 600. The harness 688 can be used to secure a human to the sixth personal aircraft 600 or otherwise another inanimate or animate object to the sixth personal aircraft 600.

Figure 10:
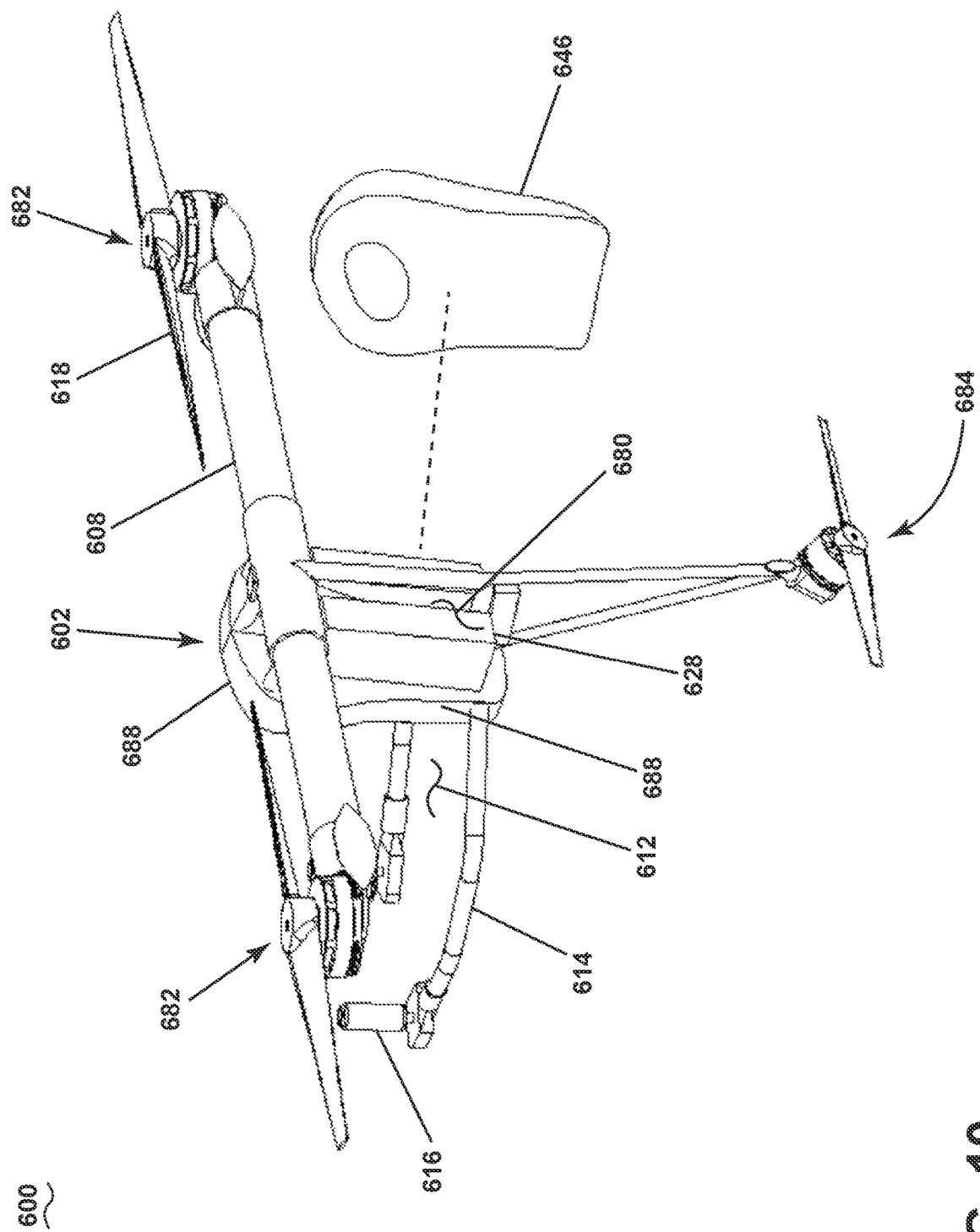
FIG. 10 is a schematic back perspective view of the sixth personal aircraft of FIG. 9, further illustrating a removable case.

FIG. 10 is a schematic back perspective view of the sixth personal aircraft 600 of FIG. 9. The sixth personal aircraft 600, like the fourth personal aircraft 400 (FIG. 6) includes the frame 602 with a case 646 that is removably mounted to a remainder of the frame 602. The case 646 at least partially encloses an interior 680 of the sixth personal aircraft 600. The interior 680 can house various articles (e.g., cargo) or components of the sixth personal aircraft 600 such as, but not limited to, a power supply 628.

Figure 11:
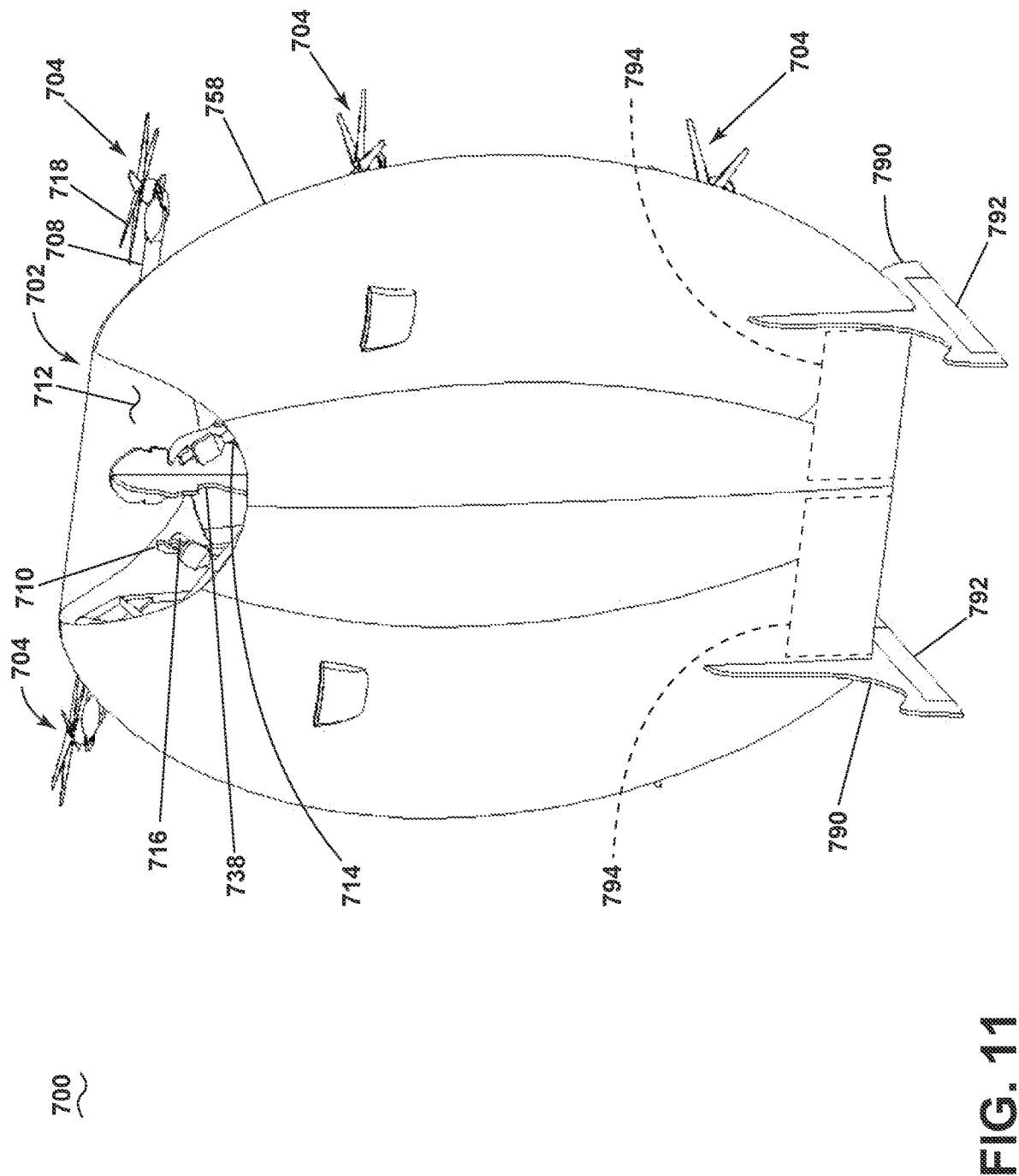
FIG. 11 is a schematic front perspective view of a seventh personal aircraft suitable for use as the first personal aircraft of FIG. 1, further illustrating a frame having a case with a set of rudders, a set of elevons, and a set of vertical stabilizers.

FIG. 11 is a schematic front perspective view of a seventh personal aircraft 700 suitable for use as the first personal aircraft 100 of FIG. 1. The seventh personal aircraft 700 is similar to the personal aircraft 100, 200, 300, 400, 500, 600, therefore, like parts will be identified by like numerals increased to the 700 series with it being understood that the description of the personal aircraft 100, 200, 300, 400, 500, 600 applies to the seventh personal aircraft 700 unless indicated otherwise.

The seventh personal aircraft 700 includes a frame 702 and a set of rotors 704 coupled to the frame 702. The frame 702 includes a body panel 710, a cross bar 708, a set of arms 714, and a vehicle interface 716. The frame 702 further includes a case 758 that, along with the body panel 710 and the set of arms 714, at least partially defines a seat 712. The vehicle interface 716 can be or include a controller module (not illustrated) to control operation of the seventh personal aircraft 700. The set of rotors 704 are operably coupled to the frame 702 via the cross bar 708. The set of rotors 704 each include a set of blades 718. The seventh personal aircraft 700 can be either controller remotely via a user 738, directly via a user mounted to the second personal aircraft 700, or autonomously via the vehicle interface 716. Each rotor of the set of rotors 704 can be statically mounted or movably mounted to the frame 702. Each rotor of the set of rotors 704, when movably mounted to the frame, can be independently movable along any suitable plane of movement.

The seventh personal aircraft 700 is similar to the fourth personal aircraft 400 (FIG. 6) and the sixth personal aircraft 600 (FIG. 9) includes the case 758. The difference, however, is that the case 758 extends around the front and the back of the body panel 710. As such, the seat 712 is defined by an interior of the case 758 such that the user 738 can enter the interior of the case 758 and fly the seventh personal aircraft 700 from within the interior defined by the case 758.

It is contemplated that during normal flight of the seventh personal aircraft 700, the seventh personal aircraft 700 can rotate 90 degrees from the illustrated configuration such that the head of the user 738 is pointed forward. It is contemplated that the illustrated configuration of the seventh personal aircraft 700 can be used during ascent, descent, landing, take-off and storage of the seventh personal aircraft 700.

The seventh personal aircraft 700 can further include a plurality of aerodynamic features provided along the case 758 that can be controlled via the vehicle interface 716 during flight of the seventh personal aircraft 700. As a non-limiting example, the seventh personal aircraft can include a set of vertical stabilizers 790, a set of Rudders 792, and a set of elevons 794. As the seventh personal aircraft 700 flies rotated 90 degrees from the illustrated configuration, these aerodynamic features are used to ensure the stability and control of the seventh personal aircraft 700.

The set of vertical stabilizers 790 can be used to stabilize the seventh personal aircraft 700 during flight by passively providing for aerodynamic stability of the aircraft . . . . The set of vertical stabilizers 790 can further be used as landing gear such that the seventh personal aircraft 700 can stand in the illustrated configuration when landed. The set of rudders 792 can be used to control the yaw of the seventh personal aircraft 700. The set of elevons 794 can be used to control the roll and pitch of the seventh personal aircraft 700.

Figure 12:
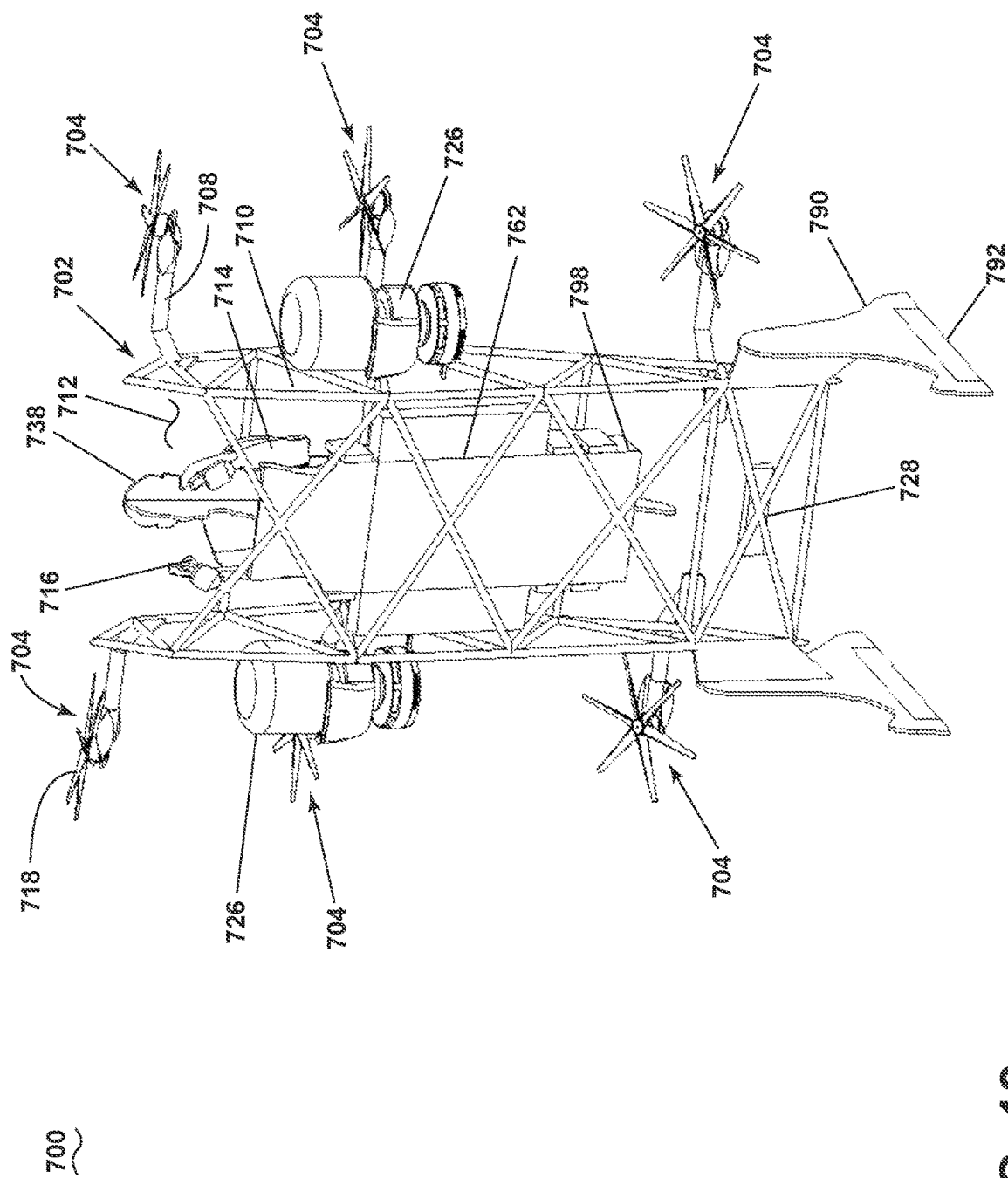
FIG. 12 is a schematic front perspective view of the seventh personal aircraft suitable for use as the first personal aircraft of FIG. 1, further illustrating an interior of the frame with the case removed.

FIG. 12 is a schematic front perspective view of the seventh personal aircraft 700 suitable for use as the first personal aircraft 100 of FIG. 1. The case 758 has been removed from the seventh personal aircraft 700 for the sake of clarity and to better illustrate the interior defined by the case 758.

As illustrated, the frame 702 includes a plurality of tubes that form a cage or a cradle for the user 738. The frame 702 can include a front body panel 762 beyond the body panel 710, hereinafter, referred to as a rear body panel 710. The front body panel 762 and the rear body panel 710 define a front side and a rear side of the seat 712. A bottom panel 798 can be provided interconnecting the front body panel 762 and the rear body panel 710 in order to encase the user 738 on the front, the back, the sides, and below the user 738.

Additional components of the seventh personal aircraft 700 can be received within the interior defined by the case 758. As a non-limiting example, a power supply 728 can be received within the case 758. A set of engines 726 can also be received within the interior of the case 758. The set of engines 726, as illustrated, can be a set of electric generators powered by gas turbine engines. The set of engines 726 can draw in air through a series of air inlets (not illustrated) along the case 758. It is contemplated that a series of air outlets (not illustrated) can be provided along the case 758 downstream of the set of engines 726 to provide an exhaust path for an exhaust of the set of engines 726.

Benefits associated of the present disclosure include a more versatile personal aircraft when compared to a conventional personal aircraft. For example, the conventional personal aircraft that is driven by a set of rotors relies on a set of rotors that are provided above the user. Otherwise, the conventional aircraft can require a set of jet propulsion engines that are normally very bulk, loud, difficult to control, and heavy. The personal aircraft, as described herein, however, relies on a set of rotors that are provided on a first side, opposite a second side including the seat, of the personal aircraft. This, in turn, ensures that the center of mass is provided within the seat and the user of the personal aircraft or otherwise the auxiliary device used in flying the personal aircraft is provided forward of the set of rotors. In other words, the field of view of the user or auxiliary device is not impeded by the set of rotors. As such, the user of the auxiliary device can have a certain freedom of movement in front of the personal aircraft, thus allowing for more versatile use of the personal aircraft (e.g., maintenance or construction) when compared to the conventional personal aircraft.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A personal aircraft comprising:
a frame including a seat body and at least one arm, the seat body having an outer surface, with a plane extending along the outer surface having a first side and a second side;
a space between the at least one arm and the outer surface of the seat body within the personal aircraft, the space being adapted to receive a payload during use of the personal aircraft, the payload being separate from the personal aircraft, and the payload being receivable along the personal aircraft; and
at least one rotor rotatable about a rotational axis, the at least one rotor being operably coupled to a first portion of the frame, the rotational axis being located on the first side;
wherein a center of mass of the personal aircraft, without the payload, is located on the second side within a portion of the space coinciding with a location where the payload is receivable.

2. The personal aircraft of claim 1, wherein the at least one arm extends from a respective portion of the frame and to the second side of the personal aircraft.

3. The personal aircraft of claim 2, wherein the at least one arm includes a vehicle interface for controlling an operation of the personal aircraft, the payload is a human, and the at least one arm and the vehicle interface extend around the human and in front of the human.

4. The personal aircraft of claim 1, wherein the frame includes at least one of a rudder, a vertical stabilizer, or an elevon.

5. The personal aircraft of claim 1, wherein the payload is an autonomous, non-human user that is communicatively coupled to the at least one rotor through a wired or wireless connection.

6. The personal aircraft of claim 1, further comprising an engine operably coupled to the at least one rotor.

7. The personal aircraft of claim 6, wherein the engine is one of an electric motor or includes a combustor.

8. The personal aircraft of claim 1, further comprising at least one power supply and the personal aircraft being powered entirely by the at least one power supply.

9. The personal aircraft of claim 1, wherein the at least one rotor is a ducted fan that includes:
a plurality of blades; and
a fan casing circumscribing the plurality of blades.

10. The personal aircraft of claim 1, wherein the at least one rotor is included within a plurality of rotors operably coupled to the frame.

11. The personal aircraft of claim 10, wherein the plurality of rotors are independently movable with respect to one another.

12. The personal aircraft of claim 10, wherein:
a first rotor of the plurality of rotors controls a yaw of the personal aircraft; and
a second rotor of the plurality of rotors controls a roll of the personal aircraft.

13. The personal aircraft of claim 10, wherein:
a first rotor of the plurality of rotors produces a thrust in a first direction; and
a second rotor of the plurality of rotors produces a thrust in a second direction, non-parallel to the first direction.

14. The personal aircraft of claim 1, wherein the at least one rotor includes a first group of blades and a second group of blades, with the first group of blades and the second group of blades being rotatable about the rotational axis in opposing circumferential directions.

15. The personal aircraft of claim 6, wherein the engine is provided on the first side.

16. The personal aircraft of claim 1, wherein the seat body is a body panel.

17. The personal aircraft of claim 1, wherein the frame includes a case extending into the second side and at least partially enclosing the space.

18. The personal aircraft of claim 1, wherein at least a portion of the frame extends into the second side and at least partially encloses the space.

19. The personal aircraft of claim 1, wherein the payload is an operator of the personal aircraft, and the center of mass is in front of, with respect to a field of view of the operator, a location where the rotational axis axially coincides with the at least one rotor.

* * * * *